United States Patent
Ko et al.

(10) Patent No.: US 6,183,862 B1
(45) Date of Patent: Feb. 6, 2001

(54) MULTILAYER PSA CONSTRUCTION EXHIBITING REDUCED TACKIFIER MIGRATION

(75) Inventors: Chan U. Ko; Hsiao K. Chuang, both of Arcadia; Ronald Ugolick, Concordia, all of CA (US)

(73) Assignee: Avery Dennison Corporation, Pasadena, CA (US)

( * ) Notice: Under 35 U.S.C. 154(b), the term of this patent shall be extended for 0 days.

(21) Appl. No.: 09/158,990

(22) Filed: Sep. 23, 1998

(51) Int. Cl.[7] ................. B32B 7/12; C09J 7/02
(52) U.S. Cl. .......... 428/354; 428/356; 428/355 BL; 428/343; 524/271; 524/481; 524/505
(58) Field of Search .............. 428/355 BL, 356, 428/354, 343; 524/481, 485, 505, 526, 271

(56) References Cited

U.S. PATENT DOCUMENTS

| | | | |
|---|---|---|---|
| 3,509,239 | 4/1970 | Tindall | 260/889 |
| 3,577,398 | 5/1971 | Pace et al. | 260/85.3 |
| 3,692,756 | 9/1972 | St. Cyr | 260/80.7 |
| 3,787,531 | 1/1974 | Dahlquist et al. | 260/876 B |
| 3,872,064 | 3/1975 | Pace et al. | 260/80.7 |
| 3,880,953 | 4/1975 | Downey | 260/876 B |
| 3,932,328 | 1/1976 | Korpman | 260/27 BB |
| 4,060,503 | 11/1977 | Feeney et al. | 260/5 |
| 4,080,348 | 3/1978 | Korpman | 260/27 BB |
| 4,104,327 | 8/1978 | Inoue et al. | 260/876 B |
| 4,125,665 | 11/1978 | Bemmels et al. | 428/352 |
| 4,260,659 * | 4/1981 | Gobran | 428/354 X |
| 4,288,480 | 9/1981 | Grzywinski et al. | 428/40 |
| 4,325,770 | 4/1982 | Korpman | 156/230 |
| 4,411,954 | 10/1983 | Butch, III et al. | 428/343 |
| 4,418,120 | 11/1983 | Kealy et al. | 428/343 |

(List continued on next page.)

FOREIGN PATENT DOCUMENTS

| | | |
|---|---|---|
| 023 8135A2 | 9/1987 | (EP) . |
| 065 6410A1 | 6/1995 | (EP) . |
| WO96/08319 | 3/1996 | (WO) . |
| WO96/08320 | 3/1996 | (WO) . |
| WO96/08367 | 3/1996 | (WO) . |
| WO96/08369 | 3/1996 | (WO) . |
| WO96/08539 | 3/1996 | (WO) . |
| WO96/25469 | 9/1996 | (WO) . |
| WO97/710310 | 3/1997 | (WO) . |
| WO98/40445 | 9/1998 | (WO) . |

OTHER PUBLICATIONS

Rubber World Magazine; Blue Book; 1987 Edition; "Materials, Compounding Ingredients and Machinery for Rubber"; pp. 440–474; Lippincott & Peto Publications.

Donatas Satas (Ed.); Handbook of Pressure Sensitive Adhesive Technology; Earle E. Ewins, Jr. et al.; "Thermoplastic Rubbers: A–B–A Block Copolymers"; Chapter 13, pp. 317–373; Van Nostrand Reinhold 1989 Publication.

(List continued on next page.)

Primary Examiner—Daniel Zirker
(74) Attorney, Agent, or Firm—Christie, Parker & Hale, LLP

(57) ABSTRACT

A multilayer PSA construction includes a facestock, a hazy, first adhesive layer adjacent the facestock, and a PSA layer adjacent the first adhesive layer, and is protected until use by a release liner. The first adhesive layer includes an immiscible blend of a first elastomer having a first glass transition temperature and forming a continuous phase, and a second elastomer forming a discontinuous phase. The second elastomer has a glass transition temperature greater than the first glass transition temperature. The first adhesive layer also contains a tackifying component, which is preferentially soluble in the discontinuous phase. The PSA layer has a composition different from the first adhesive layer and is formed of at least one tackified elastomer that provides a measurable third maximum glass transition temperature, which is less than the second glass transition temperature. The multilayer PSA construction exhibits reduced migration of tackifiers and plasticizers over time.

27 Claims, 9 Drawing Sheets

U.S. PATENT DOCUMENTS

| | | | |
|---|---|---|---|
| 4,726,982 | | 2/1988 | Traynor et al. ....................... 428/213 |
| 4,894,259 | * | 1/1990 | Kuller ................................ 427/208.8 |
| 5,180,635 | * | 1/1993 | Plamthottam et al. .............. 428/345 |
| 5,290,842 | | 3/1994 | Sasaki et al. ......................... 524/271 |
| 5,558,913 | | 9/1996 | Sasaki et al. ......................... 428/41.5 |
| 5,663,228 | | 9/1997 | Sasaki et al. ......................... 524/271 |
| 5,827,609 | * | 10/1998 | Ercillo et al. ......................... 428/354 |
| 5,856,387 | | 1/1999 | Sasaki et al. ......................... 524/271 |
| 5,925,432 | | 7/1999 | Kian et al. ........................... 428/40.1 |
| 5,943,961 | * | 11/1999 | Ugolick et al. ...................... 428/354 |

OTHER PUBLICATIONS

Donatas Satas (Ed.); Handbook of Pressure Sensitive Adhesive Technology; James A. Schlademan; "Tackifier Resins"; Chapter 20, pp. 527–544; Van Nostrand Reinhold 1989 Publication.

Legge, Norman R. et al.; Thermoplastic Elastomers, A Comprehensive Review; Chapter 13, pp. 494–495; 1987 Macmillan Publication.

* cited by examiner

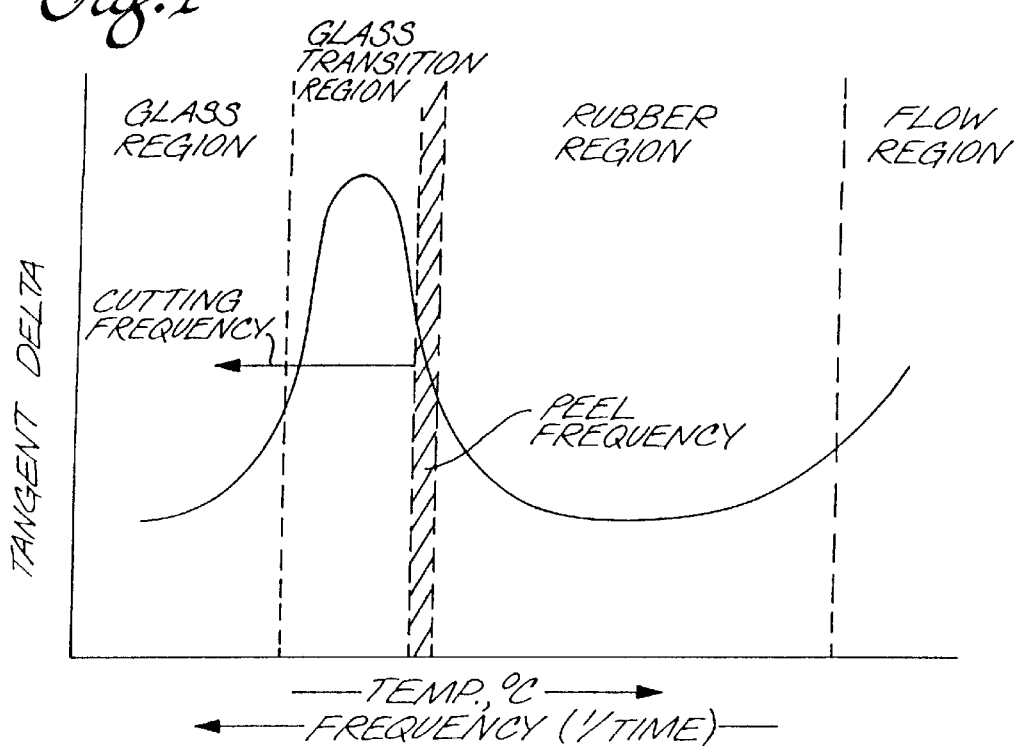
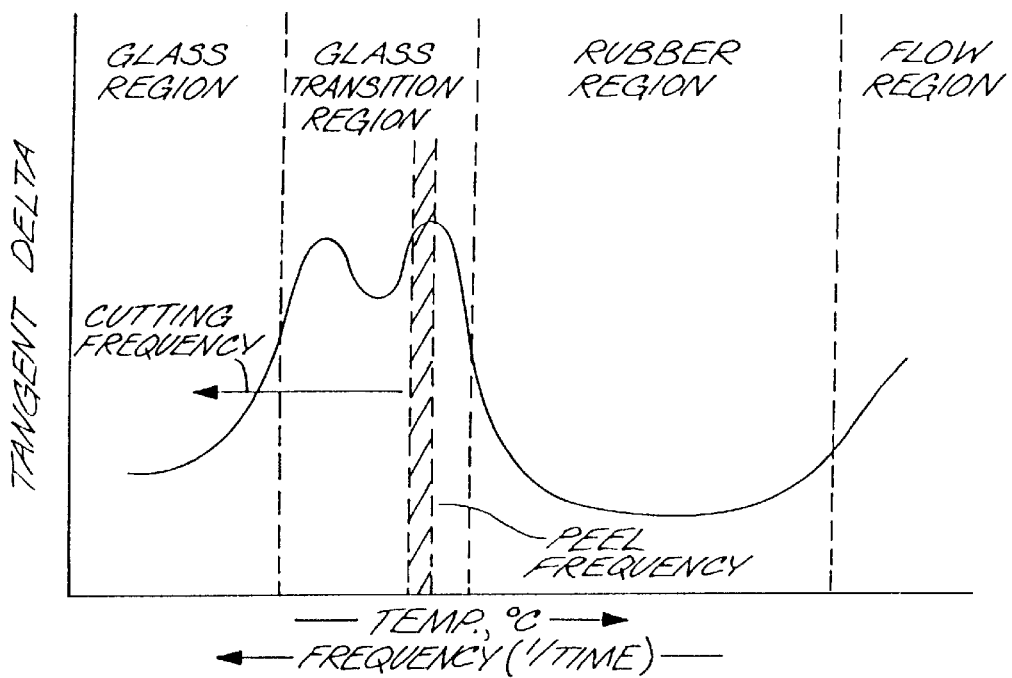

MULTILAYER PSA CONSTRUCTION EXHIBITING REDUCED TACKIFIER MIGRATION

FIELD OF THE INVENTION

The present invention is directed to label and tape constructions that employ multilayer adhesives, in which at least the layer furthest from the facestock is a rubber-based, tackified pressure-sensitive adhesive (PSA). The constructions are characterized by reduced diffusion or migration of liquid tackifiers, plasticizers and other low molecular weight constituents between layers.

BACKGROUND OF THE INVENTION

Adhesive tapes and labels having a laminate construction are well known. In a typical construction, one or more layers of adhesive are coated on or otherwise applied to a release liner, and then laminated to a facestock, such as paper, polymeric film, or other flexible material. The adhesive may be a pressure-sensitive adhesive (PSA), and may be rubber-based or acrylic-based. Rubber-based hot melt PSAs (HMPSAs) typically contain one or more natural or synthetic elastomers, tackified with a petroleum resin, rosin or rosin derivative, and/or other ingredients, such as plasticizers, which improve the tack of the adhesive.

During label manufacture, a laminate of a facestock, PSA layer and a release liner is passed through apparatus that converts the laminate into commercially useful labels and label stock. The processes involved in the converting operation include printing, slitting, die-cutting and matrix-stripping to leave labels on a release liner, butt-cutting of labels to the release liner marginal hole punching, perforating, fan folding, guillotining and the like.

Die-cutting involves cutting of the laminate to the surface of the release liner. Hole punching, perforating and guillotining involve cutting clean through the label laminate.

The cost of converting a laminate into a finished product is a function of the speed and efficiency at which the various processing operations occur. While the nature of all layers of the laminate can impact the cost of convertibility, the adhesive layer typically has been the greatest limiting factor in ease of convertibility. This is due to the viscoelastic nature of the adhesive, which hampers precise and clean penetration of a die in die-cutting operations and promotes adherence to die-cutting blades and the like in cutting operations. Stringiness of the adhesive also impacts matrix-stripping operations, which follow die-cutting operations.

Achieving good convertibility does not, by necessity, coincide with achieving excellent adhesive performance. Adhesives must be formulated to fit specific performance requirements, including sufficient shear, peel adhesion, and tack or quick stick, at various temperatures. A good, general purpose adhesive may exhibit poor convertibility simply because the adhesive is difficult to cleanly cut. Such an adhesive may stick to a die or cutting blade. An ideal HMPSA would have both high tack and high cohesive strength, good flow characteristics if it is to be used in the bulk state, so that it can be coated or otherwise applied to a facestock, or coated on a release liner and laminated to a facestock, and good converting performance.

In an effort to address the sometimes conflicting demands of good adhesive performance and good convertibility, multilayer constructions having two or more layers of adhesives have been proposed and described.

U.S. Pat. No. 4,260,659 to Gobran, incorporated herein by reference, describes a multilayer PSA tape formed of a plurality of superimposed PSA layers, the outer layer of which is softer than the immediate underlying layer.

U.S. Pat. No. 4,894,259 to Kuller, incorporated herein by reference, describes a process for producing a PSA tape comprised of a plurality of concurrently coated layers, at least the outer layer of which is a PSA layer, with contiguous layers defining an interphase between each layer, the interphase comprising a photopolymerized matrix of polymer chains extending from the matrix of one layer to the interface to the matrix of a contiguous layer. When photopolymerized, the layers cannot be delaminated.

WO96/08367 to Ercillo et al., incorporated herein by reference, describes a multilayer PSA construction in which one layer is formed with a first adhesive having a first glass transition temperature and a second layer having a second glass transition temperature. The first glass transition temperature differs from the second glass transition temperature. To the extent a tackifier and/or plasticizer is incorporated in such multilayer constructions there is no specific instruction on how to control diffusion or migration of tackifiers and/or plasticizers.

WO96/08369 to Ugolick et al, incorporated herein by reference, describes a multilayer PSA construction in which a first layer is a barrier layer and a second layer is an adhesive layer on the barrier layer. The barrier layer is a pressure-sensitive adhesive and inhibits the migration of mobile species such as oils, resins, and tackifiers from the adhesive layer into the facestock. In one embodiment, the adhesive layer is an apolar rubber-based composition, and the barrier layer is a thermoplastic acrylic PSA. The construction is useful as a label, and is designed to improve adhesion and preserve the appearance of the label by inhibiting wrinkling and/or staining.

U.S. Pat. No. 5,290,842 to Sasaki et al, incorporated herein by reference, discloses a PSA construction that utilizes a mutually immiscible first elastomer—typically a styrene-butadiene (SB) and/or styrene butadiene-styrene (SBS) block copolymer—exhibiting a first glass transition temperature, and second elastomer—typically a styrene-isoprene (SI) and/or styrene-isoprene-styrene (SIS) block copolymer—exhibiting a second glass transition temperature greater than the first. The composition is tackified by a tackifying system comprising a tackifier that is preferentially miscible in the second elastomer to provide a composition exhibiting excellent processibility and ambient and low temperature properties.

One problem with multilayer adhesive constructions is diffusion and migration of tackifiers and plasticizers, especially those of low molecular weight, which causes an undesirable change of adhesive properties. Although an intermediate barrier layer can be positioned between adhesive layers, such an approach complicates the manufacturing process and increases the cost of the multilayer construction. One proposal for reducing tackifier migration between layers has been to provide substantially equal levels of liquid tackifiers and/or plasticizer oil additives to the two layers to prevent diffusion or migration of such materials from one layer to another. However, maintaining the same ratio of tackifiers and plasticizers to elastomers in two adhesive layers has not led to a completely satisfactory result.

A need clearly exists for a more effective means of preventing migration of liquid plasticizers and tackifiers between layers of multilayer adhesive constructions so as to retain the properties of the individual adhesive layers for extended periods of time. There is also a need to prevent or reduce tackifier migration into polyolefin facestocks. When a hot melt PSA formulated with rubber-based block copolymers is used with a polyolefin facestock, swelling and hardening of the facestock can occur over time. This manifests itself as a wrinkling of the adhesive construction and/or a loss of adhesion, and is believed to be caused by the migration of tackifiers and plasticizers utilized in the rubber-based adhesives into the facestock.

SUMMARY OF THE INVENTION

According to one aspect of the present invention, there are provided multilayer adhesive constructions that exhibit reduced migration of tackifiers between adhesive layers and reduced migration into the facestock, while providing good adhesion to a variety of substrates. The constructions exhibit good adhesion, excellent convertibility in label and linerless label manufacture, and good low temperature performance. In another aspect of the invention, adhesive constructions having polyolefin facestocks and one or more layers of tackified PSAs are provided, and exhibit reduced tackifier migration into the facestocks in consequence of the particular tackifier(s) employed.

In one embodiment of the invention, a multilayer adhesive construction comprises a laminate of (a) a face stock, (b) a first adhesive layer, preferably coated on or contiguous with the facestock and (c) a second adhesive layer, preferably coated on or contiguous with the first adhesive layer. A release liner may protect the adhesive until it is to be applied to a substrate. Alternatively, a linerless construction is made, with the backside of the facestock having a release material (e.g., silicone) coated thereon.

The first adhesive layer is a tackified blend of at least two immiscible elastomers. A first elastomer is a first diene-containing elastomer characterized by a first glass transition temperature, $T_{g1}$, and a first value of tangent delta, $\tan \delta_1$. A second elastomer is a second diene-containing elastomer characterized by a second glass transition temperature, $T_{g2}$, and a second value of tangent delta, $\tan \delta_2$, where $T_{g1} < T_{g2}$. The two immiscible elastomers are provided in relative proportions such that the first elastomer (having the lowest $T_g$) is a continuous phase, and the second elastomer (having a higher $T_g$) is a discernible discontinuous phase distributed throughout and contained within the continuous phase of the first elastomer.

The first adhesive layer is tackified with one or more tackifiers and, optionally, contains one or more plasticizers. The tackifiers (and optionally the plasticizers) are selected to be preferentially soluble in the second elastomer (which has the higher $T_g$).

The second adhesive layer is a tackified elastomer (or tackified mixture of elastomers) that is a diene-containing elastomeric composition different from the first adhesive layer. In one embodiment, this diene-containing elastomeric composition is formed of a single elastomer or a miscible blend of elastomers that form a single visually discernible phase. One or more tackifiers are dispersed throughout the phase. In another embodiment, the elastomeric composition is formed of a continuous phase of a first elastomer and discontinuous phase of a second elastomer, and one or more tackifiers (and, optionally, one or more plasticizers) are dispersed throughout, and preferentially soluble in, the continuous phase.

Additional low molecular weight components, such as extenders, fillers, pigments and stabilizers may be present in the first and/or second adhesive layer(s). The adhesive layers can be independently extended using extender oil, such as Shellflex 371, and/or fillers, such as calcium carbonate. The extenders can, and preferably are, present in both the continuous and discontinuous phases of each adhesive layer. The adhesive layers also can be extended using the low molecular weight segment of the tackifiers and/or plasticizers.

In a preferred multilayer adhesive construction, the continuous phase of the first adhesive layer is formed of one or more butadiene-containing elastomers, such as styrene-butadiene-styrene (SBS) and/or styrene-butadiene (SB) block copolymers, with a mixture of SBS and SB block copolymers being preferred. Contained within the continuous phase is a discernible, discontinuous phase formed of one or more isoprene-containing elastomers, such as styrene-isoprene (SI) and/or styrene-isoprene-styrene (SIS) block copolymers, and/or multiarmned styrene-isoprene $(SI)_x$ block copolymers. One or more tackifiers—each preferentially soluble in the discontinuous phase—as well as one or more plasticizers and other low molecular weight components, are added to the elastomers forming the first adhesive layer. The second adhesive layer of the preferred construction comprises a continuous phase of an isoprene-based elastomer, such as an SIS block copolymer, and/or SI block copolymers, or a mixture of SB and SIS and/or SI elastomers, with a weight ratio of butadiene-based elastomers to isoprene-based elastomers less than about 0.5. One or more tackifiers are present in the second adhesive layer. Optionally, one or more plasticizers and other low molecular weight components are present.

Migration of tackifiers between the first and second adhesive layers is inhibited by the tackifiers' preferential solubility in the discontinuous phase of the first layer and the continuous phase of the second layer. Consequently, the adhesive properties and convertibility characteristics of the adhesive construction are preserved for extended periods of time. The result is a more commercially appealing product.

In addition to being a barrier to migration of tackifiers and other components, the first adhesive layer can be used to control the converting characteristics of the overall construction, while the second adhesive layer can be keyed to provide desirable overall adhesive properties. Also, in one embodiment of the invention, the facestock can be reinforced by selecting at least one adhesive layer that provides structural reinforcement. The phase separated layer(s) can be used to this end. Consequently, lower caliper, less expensive facestock can be used without sacrificing structural integrity of the overall laminate construction. In another embodiment, improved label repulpability can be targeted by including at least one repulpable PSA layer in the construction.

DESCRIPTION OF THE DRAWINGS

FIG. 1 is an idealized DMS (a plot of tangent delta vs. temperature or frequency) for a tackified PSA based on a single elastomer, providing a single peak in the glass transition temperature region and also depicting regions of cutting and peel frequency;

FIG. 2 is an idealized DMS for a tackified PSA based on a blend of immiscible elastomers, displaying two peaks in the glass transition temperature region;

DETAILED DESCRIPTION OF THE INVENTION

Figure 3:
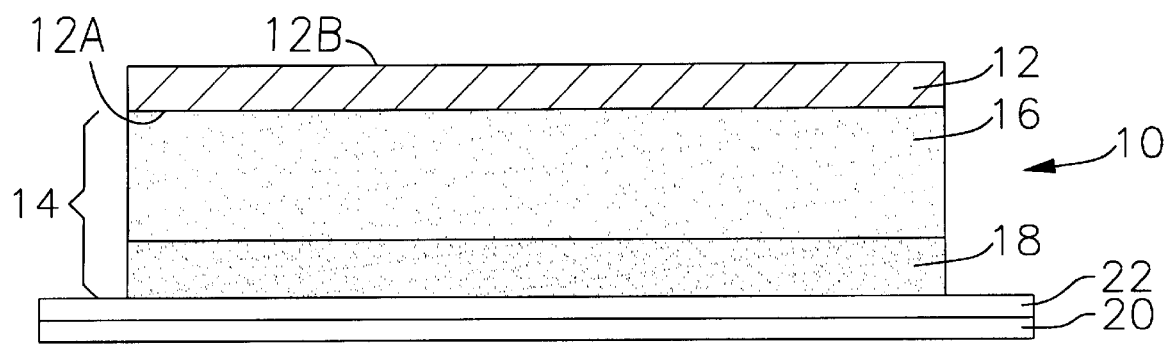
FIG. 3 is a schematic, cross-sectional illustration of one embodiment of a multilayer adhesive construction according to the invention, showing a facestock, adhesive laminate with two adhesive layers, and a release liner.

The present invention resides in the discovery that migration of tackifiers, plasticizers, and other low molecular weight components between adhesive layers of a multilayer adhesive construction can be minimized and controlled through selective use of tackified blends of elastomeric compositions, where the elastomers have dissimilar glass transition temperatures and tangent delta values and the elastomers are tackified with tackifiers that are preferentially soluble in certain elastomeric phases, but not other phases. The tackifiers and plasticizers tend to remain associated with the elastomer(s) or elastomeric segment(s) with which they are preferentially soluble, and do not migrate into other adhesive layers. Consequently, the beneficial properties of various adhesive layers of the construction—such as adhesive performance (peel, shear and tack) and convertibility—are preserved for extended periods of time.

By way of background, and with reference to FIG. 1, in a polymeric system based on a single, uncrosslinked elastomer or rubber, one finds a peak in a plot of tangent delta (tan δ) vs. temperature (°C.), measured at the frequency of 10 radians/seconds. Such a plot is called a dynamic mechanical spectrum (DMS). Tan δ is the ratio of loss modulus (G″) to storage modulus (G′). Loss modulus is a measure of the energy dissipated as heat or sound per cycle of sinusoidal deformation applied to the viscoelastic elastomer; it correlates to the amount of energy dissipated in peeling the viscoelastic elastomer from a substrate. Storage modulus is a measure of elasticity, i.e., the energy stored and recovered in the viscoelastic elastomer. From the time-temperature superposition principle, it follows that increasing temperature is equivalent to decreasing frequency. Accordingly, a DMS plot of tan δ as a function of temperature can also be viewed as a plot of tan δ as a function of frequency (1/time).

The single peak in FIG. 1 corresponds to the glass transition temperature, $T_g$, of the elastomer. As used herein, the term "glass transition temperature" means the temperature at which a polymer or polymer segment changes from a glassy to a rubbery state. Although the glass transition of most polymeric systems occurs over a range of temperatures, those skilled in the art will appreciate that a peak $T_g$ can, nevertheless be assigned, based on measured values for each polymeric system.

The cutting frequency region is also indicated in FIG. 1. The cutting frequency is above the peel frequency in the transition between the glassy region and the rubbery region. For polymers used as adhesives, particularly PSAs, tangent δ is preferably kept as low as possible for good cuttability. On the other hand, for good pressure-sensitive adhesive performance (peel adhesion), tangent delta in the transition region should be high, corresponding to a peel frequency (100 radians/second) as shown in FIG. 1.

Referring now to FIG. 2, a DMS for a tackified, two-elastomer PSA is shown, and is characterized by two glass transition peaks between the cutting and peel frequencies. As discussed below, the weight ratio of the elastomers, their composition, and the choice of tackifiers contribute to an adhesive composition characterized by reduced tackifier migration between adhesive layers.

A preferred embodiment of the invention is schematically illustrated in FIG. 3, which is a cross-sectional view of a multilayer adhesive label, i.e., a label laminate construction. In this embodiment, the construction 10 comprises a facestock 12, with inner and outer surfaces, 12a and 12b, having adhered thereto an adhesive laminate 14 formed of at least two layers, a face side adhesive (FSA) layer 16 and a liner side adhesive (LSA) layer 18. The adhesive laminate is protected until use by a release liner 20 having a release surface 22. The adhesive laminate 14 has two adhesive layers, as shown, or multiple adhesive layers. The thickness of each layer of the laminate construction is exaggerated for clarity, and the relative thicknesses of the layers are not to scale.

The facestock 12 can be any flexible material commonly used in tapes and labels, including paper; polyesters, such as polyethylene terephthalate (PET); polyolefins, such as polypropylene, ethylene-propylene copolymers, polyethylene; and other materials. The inner surface 12a of the facestock 12 (sometimes called an under surface) is optionally coated with a barrier layer (not shown) other than the barrier created by the adhesive laminate of this invention to prevent migration of constituents from the adhesive laminate 14 into the facestock 12. There may also be included, or alternatively provided, a tie or primer layer (not shown) to enhance adhesion of the adhesive laminate 14 to the facestock 12. In "linerless" constructions, the outer surface is coated with a release material, such as a silicone (e.g., polydimethylsiloxane).

The adhesive laminate 14 is comprised of at least two distinct adhesive layers 16 and 18. A face side adhesive (FSA) layer 16 is comprised of a tackified blend of at least two immiscible elastomers. The adhesive layer furthest from the facestock 12 and preferably adjacent to the FSA layer 16 is a liner side adhesive (LSA) layer 18, which is comprised of at least one elastomer, and preferably a mixture of the elastomers employed in the FSA layer. The LSA layer is a pressure-sensitive adhesive (PSA). The FSA layer also may be, and preferably is, a PSA.

More particularly, the FSA layer 16 of the adhesive laminate 14 is a tackified blend of at least two immiscible elastomers. A first elastomer comprises a first diene-containing elastomer characterized by a first glass transition temperature, $T_{g1}$. A second elastomer in the FSA layer 16 comprises a second diene-containing elastomer characterized by a second glass transition temperature, $T_{g2}$, where $T_{g1} < T_{g2}$.

The elastomers used in the present invention are natural or synthetic elastomeric polymers, including, for example, AB, ABA, and "multiarmed" $(AB)_x$ block copolymers, where for example, A is a polymerized segment or "block" comprising at least one monoalkenylarene, preferably styrene, alpha-methyl styrene, vinyl toluene, and the like; B is an elastomeric, conjugated polybutadiene or polyisoprene block; and x has a value of 3 or more. Preferred first diene-containing elastomers are butadiene-based polymers, especially styrene-butadiene-styrene (SBS) and styrene-butadiene (SB) block copolymers, where "S" denotes a polymerized segment or "block" of styrene monomers, and "B" denotes a polymerized segment or "block of butadiene monomers. Other useful butadiene-based elastomers include multiarmed $(SB)_x$ block copolymers, where x is at least 3. Alternatively, the first elastomer can be polybutadiene homopolymer. Polybutadiene blocks have a $T_g$ of about −80° C. Polystrene blocks have a $T_g$ of about 93° C. Preferred second diene-containing elastomers are isoprene-based polymers, especially styrene-isoprene-styrene (SIS) block copolymers, styrene-isoprene (SI) block copolymers, and multiarmed styrene-isoprene $(SI)_x$ block copolymers (where x is at least 3), and the like, where "I" denotes a polymerized segment or "block" of isoprene monomers. Other useful isoprene-based elastomers include radial block copolymers having a SEBS backbone (where "E" and "B" are, respectively, polymerized blocks of ethylene and butylene) and I and/or SI arms. Natural rubber (polyisoprene), synthetic polyisoprene, and/or random copolymers that are capable of forming a discontinuous phase also can be used. Polyisoprene blocks have a $T_g$ of about −54° C.

Natural and synthetic elastomers containing polybutadiene segments and polyisoprene segments are not generally miscible with each other, except at weight ratios skewed heavily in favor of one of the two elastomers. Immiscible blends of elastomeric polymers based on polybutadiene and polyisoprene, however, can be prepared. Homopolymers are more difficult to mix than block copolymers.

Figure 4:
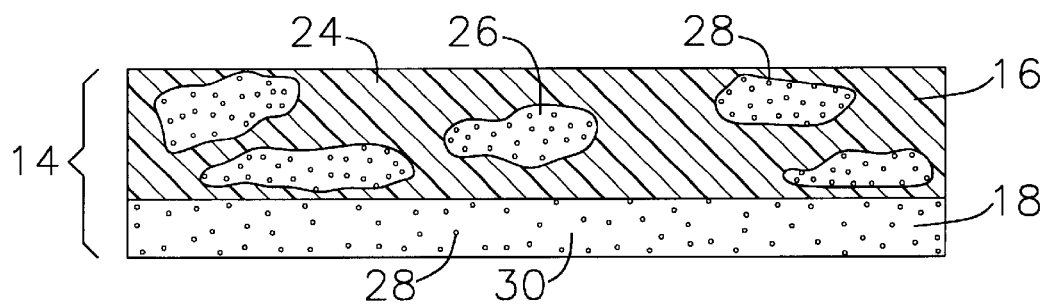
FIG. 4 is a schematic, cross-sectional illustration of one embodiment of a two-layer adhesive laminate.

Referring now to FIG. 4, one embodiment of a two-layer adhesive laminate 14 is shown. The adhesive laminate has a FSA layer 16 and a LSA layer 18. The FSA layer is formed of a tackified blend of two immiscible elastomers, which are provided in relative proportions such that the first elastomer forms a continuous phase 24 and the second elastomer forms a discontinuous phase 26, contained within and distributed throughout the continuous elastomeric phase. The immiscible blend of elastomers is tackified with one or more tackifiers 28, which are preferentially soluble in the discontinuous elastomeric phase 26.

A preferred FSA layer 16 has a continuous phase 24 of a butadiene-containing block copolymer, e.g., SBS and/or SB block copolymers. Distributed throughout the continuous phase is a discernible, discontinuous phase 26 of polyisoprene or, more preferably, an isoprene-containing block copolymer, e.g., SIS and/or SI block copolymers.

Where immiscible blends of butadiene block copolymers and isoprene block copolymers are used to form the FSA layer 16, the elastomers are blended together at a weight ratio of butadiene-based elastomers to isoprene-based elastomers of from about 0.5:1 to 5:1, preferably from about 1:1 to 5:1, more preferably from about 1.5:1 to 2:1. A particularly preferred weight ratio is about 1.5:1 parts by weight of butadiene-based to isoprene-based elastomers.

Commercially available isoprene-based elastomers useful in the practice of the present invention include linear SIS and/or SI block copolymers such as Quintac 3433 and Quintac 3421, available from Nippon Zeon Company, Ltd. (U.S. sales office—Louisville, Ky.); Vector DPX 559, Vector 4111 and Vector 4113 available from Dexco, a partnership of Exxon Chemical Co. (Houston, Tex.) and Dow Chemical Co. (Midland Mich.); and Kraton® rubbers, such as Kraton 604x, Kraton D-1107, Kraton D-1117, and Kraton D-1113, available from Shell Chemical Co. (Houston, Tex.). Kraton D-1107 is a predominantly SIS elastomer containing about 15% by weight SI block copolymers. Kraton D-1320x is an example of a commercially available $(SI)_xI_y$ multiarmed block copolymer in which some of the arms are polyisoprene blocks. Commercially available butadiene-based elastomers include SBS and/or SB rubbers, such as Kraton D-1101, D-1102 and D-1118X, from Shell Chemical Co.; Solprene 1205, a SB block copolymer available from Housemex, Inc. (Houston, Tex.); and Kraton TKG-101 (sometimes called "Tacky G"), a radial block copolymer having an SEBS backbone (E=ethylene block; B=butylene block) and I and/or SI arms.

Immiscibility of the first and second elastomers is indicated by a hazy appearance of the first adhesive layer, as measured by ASTM D1003, and occurs at a weight ratio of first elastomer to second elastomer greater than or equal to about 0.5:1.0, more typically greater than about 1:1. The distinct phases of the first and second elastomers can be observed by transmission electron microscopy (TEM).

It will be appreciated that, when sytrene-containing block copolymers (such as SBS, SIS, SB and SI) are employed as elastomers in the adhesive layers described herein, the polymerized styrenic segments will form their own discrete phase, in addition to the phase(s) formed by the other elastomer(s). The styrenic phase appears in TEM photomicrographs as a vast plurality of discrete, globular domains dispersed throughout the adhesive layer. However, the size of the dispersed styrenic domains is quite small—less than 500 nm—and, therefore, the presence of discrete styrenic domains in an otherwise continuous phase of one elastomer or a miscible blend of elastomers does not cause the overall adhesive layer to be hazy in appearance. The small styrenic domains do not refract visible wavelengths of light to any appreciable degree. Accordingly, in describing the present invention, the terms "continuous phase" and "discontinuous phase" are used to describe and refer to the non-styrenic phases of the various elastomeric systems present in the FSA and LSA layers.

Referring again to FIG. 4, the second elastomer of the FSA layer is tackified with a tackifying system (described below) comprising at least one tackifier 28 and, optionally, at least one plasticizer (not shown), with both the tackifier(s) and plasticizer(s) being more soluble in the second elastomer than in the first elastomer. Such preferential solubility causes the tackifier(s) and plasticizer(s) to remain in the discontinuous phase 26 of the FSA layer 16, and inhibits migration of the tackifying system into the second adhesive layer 18 of the adhesive laminate 14.

The second layer of the adhesive laminate 14 is a LSA layer 18, which is compositionally different from the FSA layer 16 and comprises one or more tackified elastomers, which may have two glass transition temperatures and provides either single phase or a continuous and discontinuous phase. A tackifying system comprising one or more tackifiers and, optionally, one or more plasticizers, is also present. In a preferred embodiment, where the FSA layer 16 has a butadiene-based continuous phase and an isoprene-based discontinuous phase, the LSA layer 18 is composed of either tackified polyisoprene or, more preferably, a tackified mixture of butadiene-based and isoprene-based elastomers, where the elastomers are provided in relative proportions such that the resulting mixture forms a single discernible phase 30 of butadiene-containing and isoprene-containing elastomers. Thus, the weight ratio of the butadiene-containing to isoprene-containing elastomers is sufficiently low, i.e., less than 0.5:1, more preferably less than about 0.4:1, that the elastomers are not immiscible, as indicated by a haze measurement and/or TEM.

Because the tackifiers 28 are preferentially soluble in the isoprene-containing elastomers in the adhesive laminate, they are primarily confined to the discontinuous phase 26 of the FSA layer 16 and the single phase 30 of the LSA layer 18, and do not migrate substantially between the layers.

Figure 5:
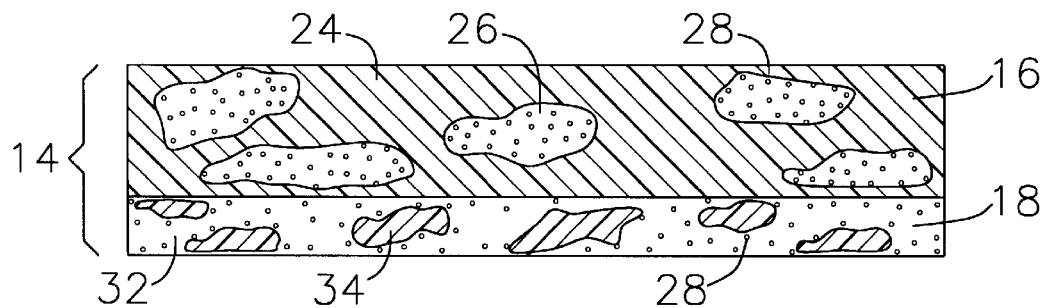
FIG. 5 is a schematic, cross-sectional illustration of another embodiment of a two-layer adhesive laminate.

In an alternate embodiment shown in FIG. 5, an adhesive laminate is formed of a FSA layer 16 and a LSA layer 18. The FSA layer is as described above and has, for example, a continuous phase 24 of at least one butadiene-based elastomer and a discontinuous phase 26 of at least one isoprene-based elastomer. One or more tackifiers are present and preferentially soluble in the discontinuous phase. The LSA layer 18 is also composed of a tackified blend of at least two immiscible elastomers, which form, respectively, a continuous phase 32 and a discontinuous phase 34. Where the FSA layer has a continuous butadiene-based phase and a discontinuous isoprene-based phase, it is preferred that the LSA layer 18 has a continuous isoprene-based phase and a discontinuous butadiene-based phase, with one or more tackifiers 28 present and preferentially soluble in the isoprene-based phases. As in the embodiment shown in FIG. 4, migration of the tackifiers from isoprene-based to butadiene-based phases is inhibited.

With both embodiments, the beneficial properties of the layers 16 and 18 will be preserved with time and will not change in consequence of tackifier migration. The inhibition of tackifier migration also should result in reduced swelling of the facestock, in those embodiments where a polymeric facestock is used.

Tackifiers and other additives that can be combined with isoprene-based and butadiene-based elastomeric compositions vary in their compatibility with the butadiene or isoprene portions of the elastomers. While preferentially soluble in either the isoprene or the butadiene segments, normally there is some degree of compatibility with both components. Additives that tend to increase or have no impact on the glass transition temperature of the elastomer (s) are regarded in the art as tackifiers, while those tending to lower glass transition temperature are known as plasticizers. The tackifiers and other additives may also be preferentially soluble in the polystyrene portion of the elastomer, and may act as a reinforcing agent.

The tackifying systems used in the present invention compromise one or more tackifiers that increase glass transition temperature, and optionally, one or more plasticizers. For FSA layer 16, the tackifier(s) and plasticizer(s) are preferentially soluble in the discontinuous phase formed by the high $T_g$ elastomer(s) which, in a preferred embodiment, is an isoprene-based elastomer or elastomers. Tackifiers that are partially soluble in the continuous phase may also be used. For LSA layer 18, the tackifier(s) and plasticizer(s) are preferentially soluble in the continuous isoprene-based elastomeric phase (in two-phase embodiments) or are dispersed throughout the LSA layer (in single-phase embodiments).

Tackifiers useful in the practice of the present invention include normally solid tackifiers (solid at or near room temperature), normally liquid tackifiers (liquid at or near room temperature) and intermediate softening point resins (ISPRs). One or more plasticizers, such as a plasticizer oil, also may be included. Normally solid tackifiers, when prilled, tend to remain prilled, even under hot, humid conditions. They tend to have softening points greater than about 80° C., and are solid at or near room temperature (20–25° C.). Normally liquid tackifiers are liquids at room temperature, with softening points less than about 20° C. ISPRs are hydrocarbon resins that are semi-solid materials at room temperature, with softening points ranging from about 35–60° C., more preferably about 50 to 60° C.

The tackifier(s) used in the FSA layer either increase or leave unchanged the glass transition temperature of the discontinuous elastomeric phase (e.g., the isoprene-based phase), while the plasticizers, if present, tend to lower the glass transition temperature of the discontinuous elastomeric phase. For the FSA layer, the tackifying system is preferentially soluble in the discontinuous phase and has the net effect of amplifying the difference in glass transition temperatures of the continuous and discontinuous elastomeric phases, and also amplifies the tangent delta value of the discontinuous elastomeric phase.

Preferred tackifiers that are preferentially soluble in isoprene-based elastomers are obtained by polymerization of a stream of aliphatic petroleum derivatives in the form of dienes and mono-olefins containing 5 or 6 carbon atoms, generally in accordance with the teachings of U.S. Pat. Nos. 3,577,398 to Pace and 3,692,756 to St. Cyr, both incorporated herein by reference. The resulting hydrocarbons range from materials that are normally liquid at room temperature to materials that are normally solid at room temperature, and typically contain 40% or more by weight polymerized dienes. The dienes are typically piperylene and/or isoprene. Nonlimiting examples include the Wingtack® family of resins sold by the Chemical Division of Goodyear Tire and Rubber Company (Akron, Ohio). Wingtack® resins have a numerical designation that corresponds to the softening point of the resin, i.e., Wingtack 95 is normally a solid resin at room temperature, with a softening point of about 95 ° .C, and Wingtack 10 is normally a liquid resin at room temperature, with a softening point of about 10° C.

Other normally solid tackifiers include Escorez 1304 and Escorez 1310-LC, manufactured by Exxon Chemical Co. (Houston, Tex.), and Piccotac 95, manufactured by Hercules Inc. (Wilmington, Del.).

Nonlimiting examples of ISPRs include RES-A-2514, from Hercules Inc. (Houston, Tex.) and ECR-185, from Exxon Chemical Co. RES-A-2514 is a modified $C_5$-type petroleum resin with approximately 5 to 25% aromatic content (primarily $C_8$ and/or $C_9$ compounds), made by copolymerizing one or more $C_5$ monoolefins and/or diolefins with one or more $C_8$ or $C_9$ monoalkenyl aromatic hydrocarbons. Nonlimiting examples of $C_5$ monoolefins and diolefins are isoprene, 2-methyl-1-butene, 2-methyl-2-butene, cyclopentene, 1-pentene, cis- and trans-2-pentene, cyclopentadiene, and cis- and trans-1,3-pentadiene. Nonlimiting examples of $C_8$ and $C_9$ monoalkenyl aromatic compounds are styrene, methyl styrene, and indene.

Both Res-A-2514 and ECR-185 have softening points intermediate that of normally liquid resins and normally solid resins, and are semi-solid at ambient temperature. At the low deformation frequencies encountered in bonding processes (i.e., application of an adhesive construction to a substate), ISPRs flow, thereby imparting good wettability to the adhesive system. But unlike conventional liquid resins or plasticizing oils, ISPRs behave more like solid resins at high deformation frequencies, increasing the storage modulus of the adhesive system and enhancing die-cutting and converting performance. ISPRs appear to compatibilize the two immiscible elastomers, which then tend to exhibit a single glass transition temperature peak in a dynamic mechanical spectrum (DMS). However, in some embodiments, two glass transition temperatures may be observed. Adhesive formulations incorporating ISPRs have lower percent volatiles than those formulated with a liquid resin and plasticizing oil, and can be applied over a broader range of temperatures than similar systems formulated with normally liquid and/or normally solid resins and plasticizing oils. In addition, heat-aging studies indicate that the ISPR-based HMPSAs have less bleed and staining tendencies than HMPSAs formulated with liquid tackifiers and plasticizers.

Other compositions that serve a tackifier function for isoprene-based elastomers include hydrogenated aromatic resins in which a very substantial portion, if not all, of the benzene rings are converted to cyclohexane rings (for example, the Regalrez family of resins manufactured by Hercules, such as Regalrez 1018, 1033, 1065, 1078 and 1126, and Regalite R-100, the Arkon family of resins from Arakawa Chemical (U.S. sales office—Chicago, Ill.), such as Arkon P-85, P-100, P-115 and P-125) and hydrogenated polycyclic resins (typically dicyclopentadiene resins), such as Escorez 5300, 5320, 5340 and 5380 manufactured by Exxon Chemical Co.

There can be also added rosins, rosin esters, polyterpenes and other tackifiers that are compatible to some degree with the polyisoprene and polybutadiene phases. Other additives include plasticizer oils, such as Shellflex 371, manufactured by Shell Chemical Co. and Kaydol mineral oil, manufactured by Witco Chemical Corp. (Houston, Tex.), which are soluble in both the polyisoprene and polybutadiene phases.

In one embodiment, the tackifying system is present in an amount, based on the total weight of tackifying system and elastomers within a given adhesive layer, of from about 50% to 80% by weight, preferably from 50% to about 70% by weight, more preferably from about 60% to 70% by weight. The presently preferred ratio is about 38% by weight elastomer(s) and about 62% by weight tackifying system, the latter preferably consisting of a normally solid tackifier, such as Wingtack 95 or Escorez 1310 LC. Polystyrene reinforcing additives also can be present.

Other components can be added to the formulation of each adhesive layer to improve the stability of the adhesive, extend the formulation, impart structural reinforcement, improve repulpability, or impart some other desirable property. Nonlimiting examples include fillers, such as calcium carbonate, which improves the cuttability of the resulting multilayer construction; stabilizers, such as Irganox 565 and Irgafos 168, both from the Ciba Additives Division of Ciba-Geigy Corp. (Terrytown, N.Y.), which inhibit oxidative degradation of the adhesives; and pigments.

The elastomeric compositions used in the practice of the present invention are prepared in a conventional manner by blending together elastomers, tackifier(s), plasticizer(s), stabilizer(s), and other components in a mixer, at elevated temperature, preferably in an inert atmosphere. The processing technique may affect the morphology and rheometrics of the resulting composition. For example, multi-gram quantities of a two-elastomer formulation compounded by an extruder mixer, having a residence time of about one minute, produced a well-mixed melt that gave two $T_g$ peaks in a DMS. When the same formulation was mixed in a sigma mixer with a residence time of about 30 minutes, more shearing forces were encountered, and the resulting DMS revealed a less pronounced $T_{g1}$ and a $T_{g2}$ shifted toward a lower temperature.

In the preferred adhesive constructions of the present invention, the adhesive layers 16 and 18 are provided in a combined weight per unit area (i.e., coat weight) of from about 4 to 200 grams per square meter ($g/m^2$), preferably from about 4 to 100 $g/m^2$. The coat weight of each individual layer will generally be within the range of from about 2 to 50 $g/m^2$. Coat weights for each individual layer may be as large as about 100 $g/m^2$. The presently preferred coat weights of individual layers range from about 2 to 35 $g/m^2$, more preferably about 2 to 15 $g/m^2$. Depending on the intended application, degree of guillotinability required, and other factors, the FSA and LSA layers may have the same or unequal thicknesses.

The multilayer label laminates of the present invention can be manufactured in accordance with many methods well known to those of ordinary skill in the multilayer coating art. Two or more layers can be applied to an appropriate substrate by, for example, separately coating each layer out of solvent to different substrates, drying the multiple coatings separately, and then laminating them together to form an integral product. Alternatively, two adhesive layers can be sequentially coated out of solvent or as a hot-melt onto the facestock or release liner. Other known methods of simultaneous or near-simultaneous coating, include slide coating, multilayer die coating, die/slide combination coating, and the like can be used. A preferred method of manufacture uses a multilayer die and is described in U.S. Pat. No. 5,728,430, which is incorporated herein by reference.

In general, the adhesive formulations for the LSA layer 18 are selected to provide high PSA performance (peel, shear, and/or tack). The adhesive formulations for the FSA layer 16 are selected to enhance the convertibility of the resulting multilayer construction and, therefore, tend to be brittle and crack under action of a die or other cutting surface at the cutting frequency, rather than smear and conform to the cutting surface. With reference to FIG. 2, at a ratio of butadiene-based elastomers to isoprene-based elastomers of about 0.5:1 or higher, two transition temperature peaks are initially observed and the tangent δ is high, indicating a high amount of energy loss in cutting any PSA with this elastomeric formulation (for example, formulation B described below). At higher ratios of butadiene to isoprene segments in which the mixture of immiscible elastomers contains a discontinuous isoprene-based phase, which serves as a reservoir for tackifiers which are preferentially soluble in the isoprene-based phase, the mixture exhibits two glass transition temperature peaks and lower tangent delta values. A lower overall energy is required to cut such a formulation.

Figure 6:
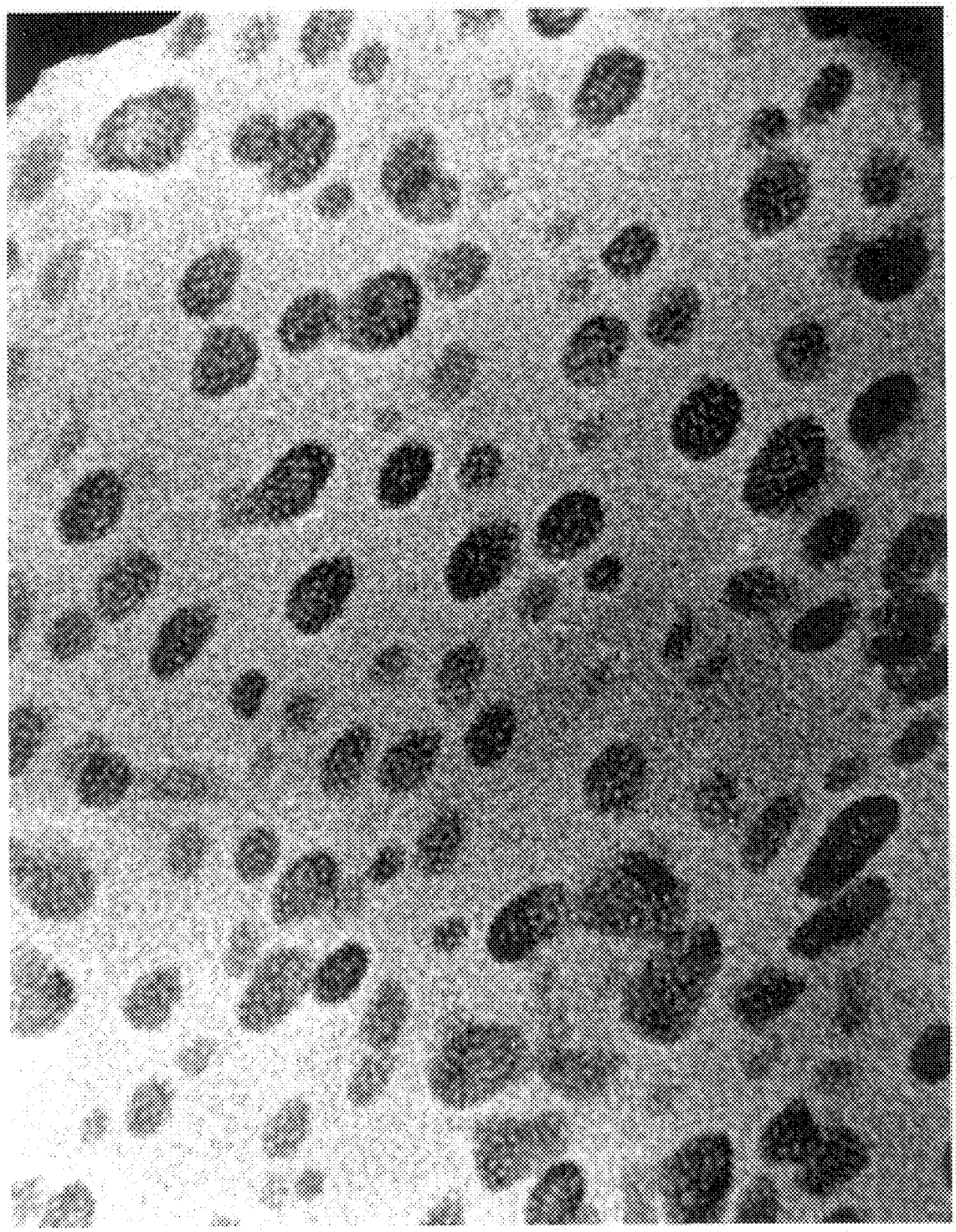
FIG. 6 is a TEM photomicrograph of a longitudinal cross-section of a tackified adhesive layer containing both isoprene- and butadiene-based elastomers, as described in Example A.
Figure 7:
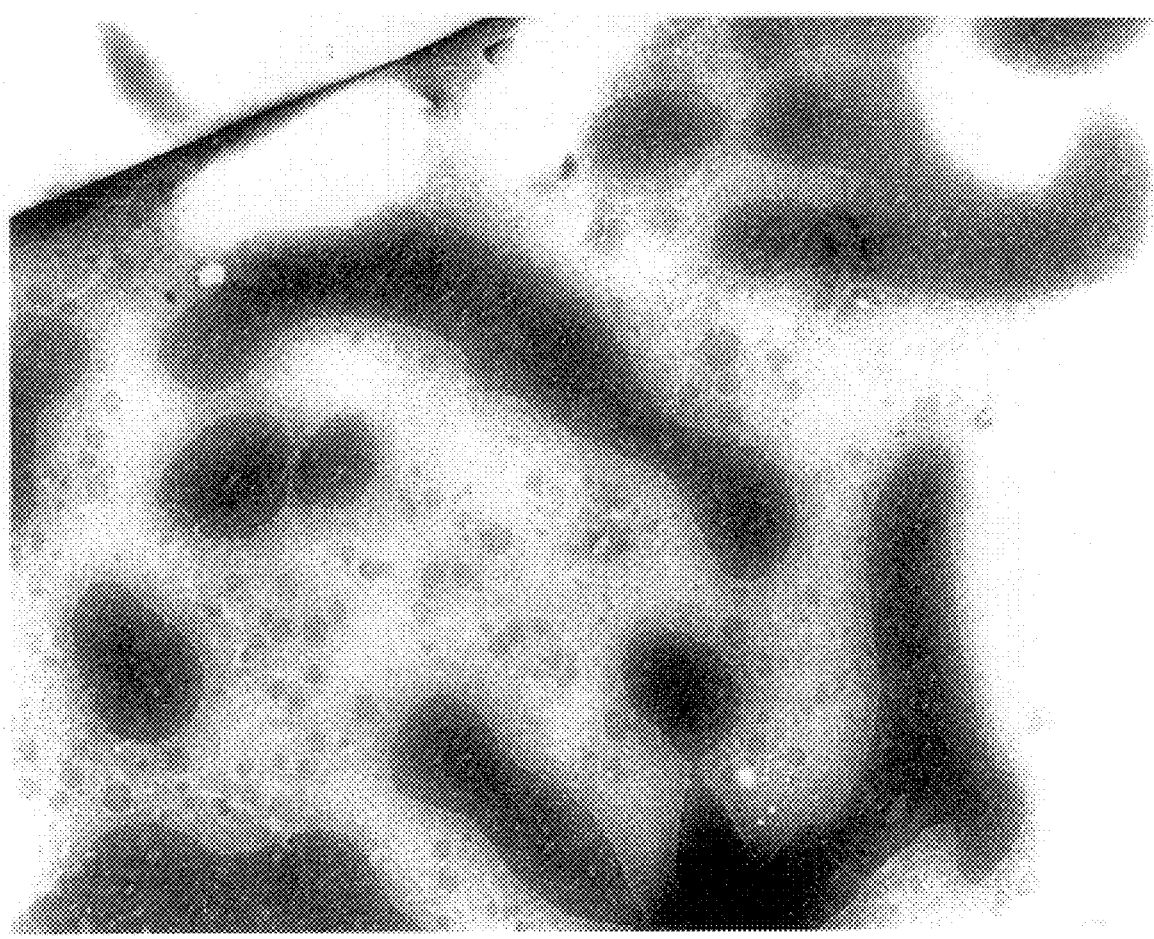
FIG. 7 is a TEM photomicrograph of a tackified adhesive layer containing a continuous phase of a butadiene-based elastomer and a discontinuous phase of an isoprene-based elastomer, as described in Example B.

FIGS. 6 and 7 are photomicrographs of two different adhesive layers, with FIG. 6 corresponding to an LSA layer 18 and FIG. 7 corresponding to an FSA layer. The layers were ultra-cryo-microtomed and stained with $OsO_4/RuO_4$, and photomicrographs were taken with a transmission electron microscope (TEM). FIG. 6 shows that the LSA layer 18 has a more homogeneous blend of the elastomers, which form more or less a single visually discernible phase, with the tackifier distributed throughout both elastomers because discontinuous phase confinement of the tackifier does not occur. In contrast, and with reference to FIG. 7, the elastomeric mixture in the FSA layer 16 is such that the elastomers are provided in proportions where there is exhibited at least one glass transition temperature attributed to the elastomer of lowest glass transition temperature forming the continuous phase 24, and a different glass transition temperature is attributed to the elastomer of highest glass transition temperature forming the discontinuous phase 26. Tackifiers and plasticizers are concentrated in the discontinuous phase 26, which is surrounded by the continuous phase 24; consequently there is a barrier to migration of the tackifiers 28 from the continuous phase 24 into and through the discontinuous phase, as evidenced by a more sparse and less uniform distribution of tackifier particles. The two glass transition temperatures enhance converting of the laminate by causing the adhesive laminate to be sufficiently rigid at the cutting frequency to prevent adhesive smearing on cutting blades and dies. The FSA layer 16 may also serve as a functional PSA.

EXAMPLES AND EXPERIMENTAL DATA

In the following examples, multilayer adhesive laminates, adhesive constructions, and their component adhesive layers are described and compared to one or more controls. DMS plots were prepared and are presented in FIGS. 8 and 9. Experiments with tackifier migration between adhesive layers were carried out by measuring the shift in glass transition temperatures of the elastomers in each layer over time. Tan δ and $T_g$ were measured as a function of temperature or frequency by placing an approximately 1–1.5 mm thick elastomeric sample between two parallel plates of, e.g., a Rheometrics instrument (Model RMS-800, manufactured and sold by Rheometrics, Inc., Piscataway, N.J.), and oscillating the plates relative to each other at 10 radians/second. Measurements were made on a continuous basis, and tan δ values were computed as a function of temperature in °C.

Example 1 and Control 1

To demonstrate the use of two adhesive layers to control tackifier migration between adjacent layers, three adhesive formulations, A, B and C, were prepared by blending together elastomers, tackifiers, and other components in a sigma mixer. The formulations were then laminated together in pairs, and DMS data was obtained for two laminates: Control 1 and Example 1. Table 1 provides composition and other data for the three formulations. Component amounts are expressed in grams.

TABLE 1

COMPOSITION OF TACKIFIED ELASTOMERIC FORMULATIONS

| COMPONENT | A | B | C |
|---|---|---|---|
| Elastomers, Tackifiers and Plasticizers | | | |
| Kraton 1107[1] (SIS,SI) | 16.5 | 13 | 23.5 |
| Solprene 1205[2] (SB) | 8.5 | 19 | 11.5 |
| Escorez 2596[3] | 55 | 58 | 37 |
| Wingtack 10[4] | 10 | 0 | 14 |
| Shellflex 371 | 10 | 12 | 14 |
| | 100 | 102 | 100 |
| Filler and Stabilizers | | | |
| Camel White (CaCO$_3$) | 8.5 | 12 | 8.5 |
| Irganox 565 | 0.6 | 0.6 | 0.6 |
| Irgafos 168 | 0.3 | 0.3 | 0.3 |
| Butadiene:Isoprene Ratio | 0.5 | 1.5 | 0.5 |
| Glass Transition Temp (° C.) | | | |
| $T_gA$ | 30 | — | — |
| $T_gB$-1 | — | −40 | — |
| $T_gB$-2 | — | 45 | — |
| $T_gC$ | — | — | −3 |
| Formulation Appearance | Clear | Hazy | Clear |

[1]$T_g$ (isoprene segments): −50° C.
[2]$T_g$ (butadiene segments): −81° C.
[3]Normally solid tackifier; Softening Point 50° C.
[4]Normally liquid tackifier; Softening Point 10° C.

Control 1 was prepared by laminating formulations A and C. Example 1 was prepared by laminating formulations B and C. Both adhesive laminates were prepared by separately applying an elastomeric formulation (A, B or C) to a release liner with a hot melt press, at a thickness of about 1–1.5 mm, and then marrying two formulations together. In each case, formulation C corresponds to an LSA and formulations A and B correspond to FSAs.

Figure 8:
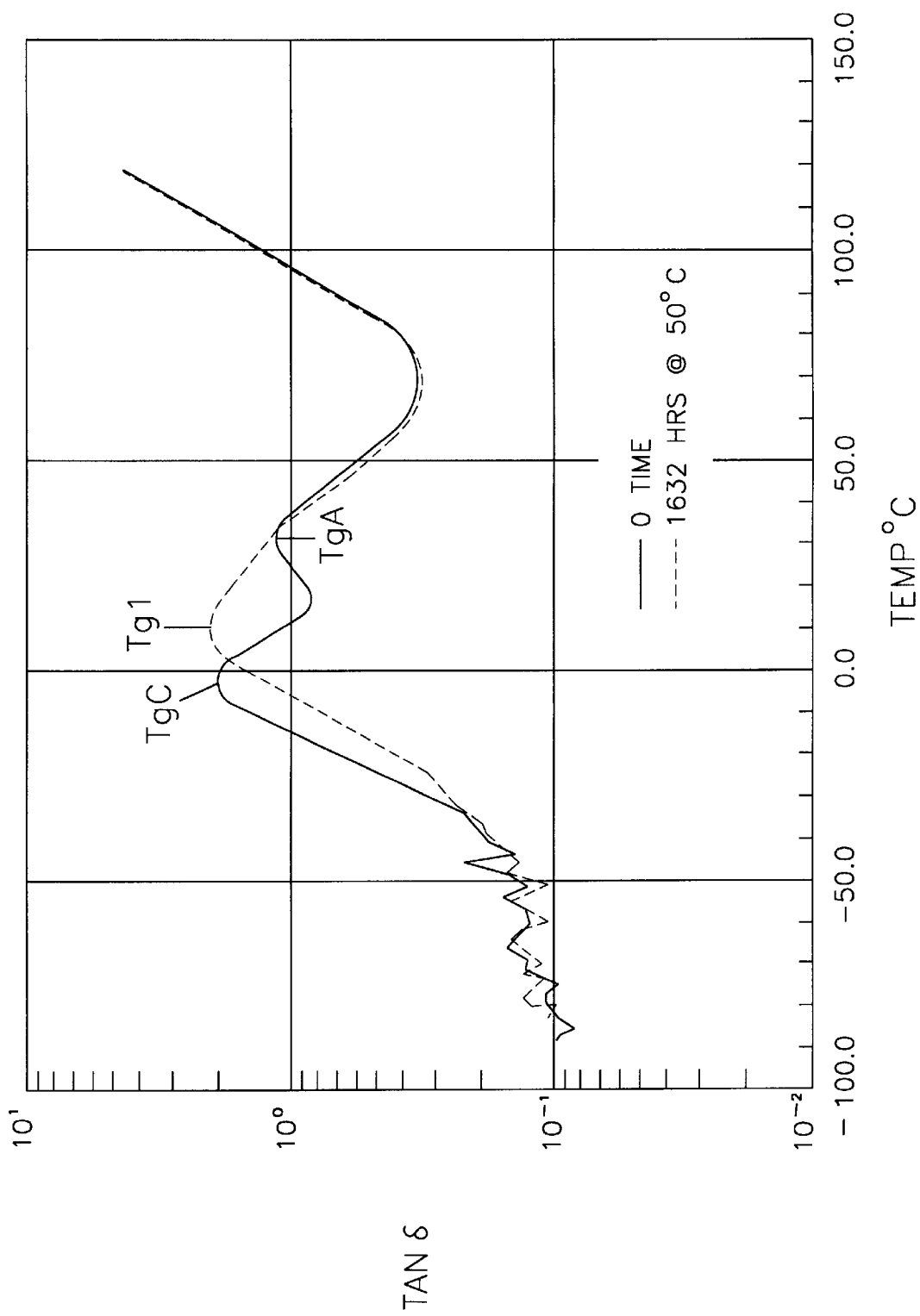
FIG. 8 is a DMS of both the original (unaged) and aged multilayer A/C adhesive laminate of Control 2.

FIG. 8 is a DMS of Control 1 (the A/C laminate) before and after aging for 1632 hrs. The unaged control is plotted as a solid curve and the aged control is plotted as a dashed curve. The contribution to $T_g$ from Formulation A ($T_gA$) and Formulation C ($T_gC$) is shown. After 1632 hrs, the glass transition temperatures merged into a single $T_g(T_g1)$ at 0.6° C., showing that, over time, considerable tackifier and plasticizer migration took place between layers A and C, despite the fact that the ratios of rubbers to liquid tackifier and plasticizer oil were, in each instance, the same.

Figure 9:
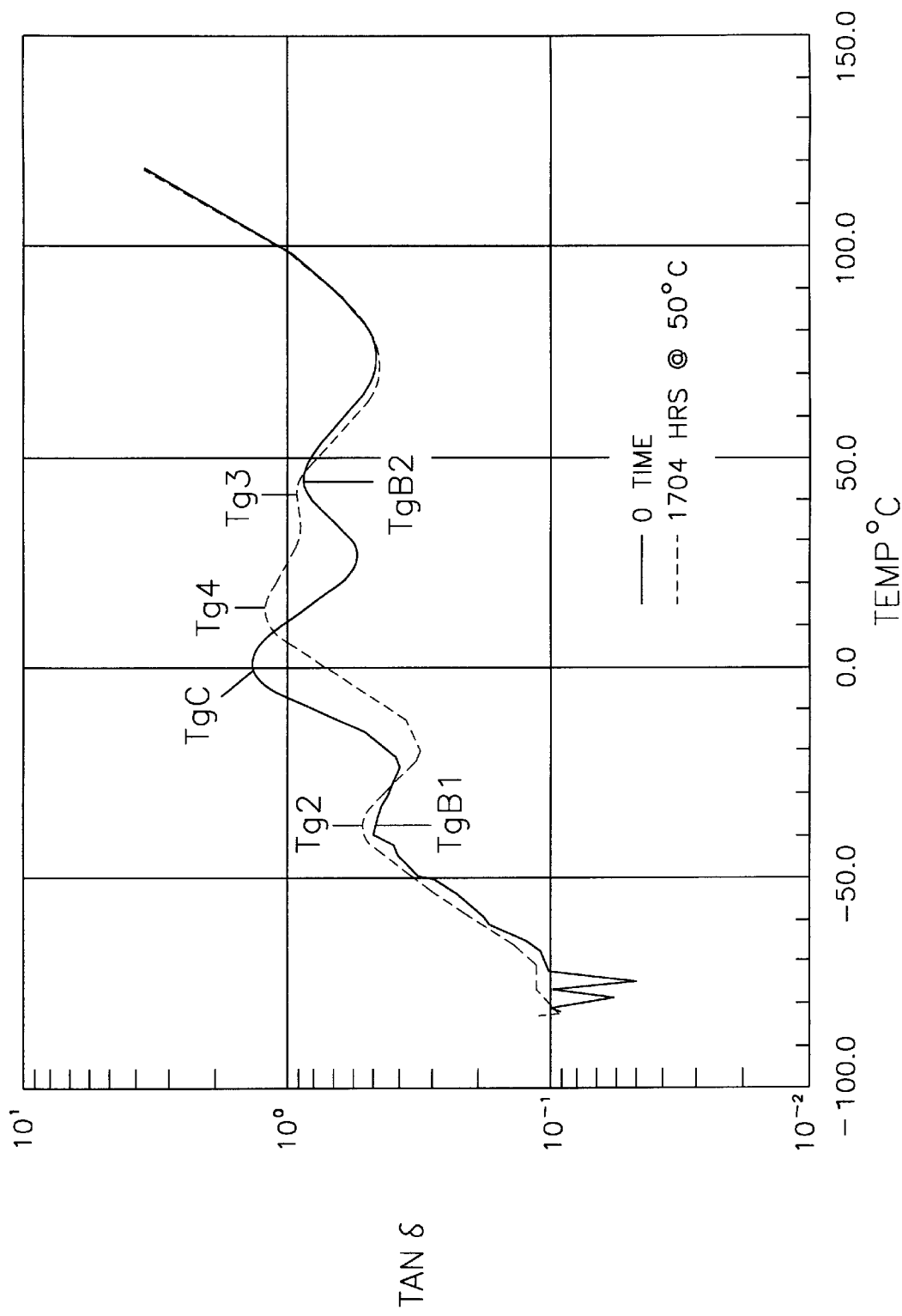
FIG. 9 is a DMS of both the original (unaged) and aged multilayer B/C adhesive laminate of Example 1.

FIG. 9 is a DMS for Example 1 (the B/C laminate). The elastomeric mixture had three glass transition temperatures; $T_gB$-1 and $T_gB$-2 (for, respectively, the two immiscible elastomers in the FSA layer B) and $T_gC$ (for the miscible elastomeric composition in LSA layer C). After aging for 1704 hours, three glass transition temperatures were again observed: $T^g2$ and $T^g3$, attributed to the FSA layer B, and $T^g4$, attributed to the LSA layer C. The data demonstrates that, through careful formulation and combination of the adhesive layers, migration of tackifying components over time can be effectively eliminated or inhibited.

Example 2

Haze Measurement

As noted above, immiscibility of the two elastomers in a given adhesive layer can be indicated by a hazy appearance of the coated films. To evaluate the immiscibility of styrene-butadiene and styrene-isoprene-styrene elastomer blends, six different adhesives samples, D–I, were prepared by blending elastomers and tackifier in a sigma mixer, coating the formulation on a facestock, and then measuring the haziness of the coated sample. In each case, the SB copolymer was Solprene 1205, the SIS copolymer was Kraton 1107, and the tackifier was Escorez 1304. Each sample contained a total of six grams of elastomer and 9 grams of tackifier, with elastomer blending ratios as indicated in Table 2. The tackified elastomers were dissolved in toluene and coated on a 2 mil polyester (PET) film to an adhesive layer thickness of about 1 mil. Haze measurements were made according to ASTM D1003, using a "haze-gard plus 4725" BYK Gardner haze meter. The uncoated PET film had a haze measurement of 0.34%. Haze measurement data for samples D–I are presented in Table 2.

TABLE 2

HAZE OF TACKIFIED ELASTOMER BLENDS

| Sample | SB/SIS Ratio | % Haze |
|---|---|---|
| D | 0.4 | 1.87 |
| E | 0.5 | 2.04 |
| F | 0.62 | 2.39 |
| G | 0.82 | 3.03 |
| H | 1.0 | 3.57 |
| I | 1.5 | 3.21 |

Example 3 and Controls 2 and 3

In order to prepare multilayer constructions according to Example 3 and Controls 2 and 3, four adhesive formulations, J–M, were prepared by blending together elastomers, tackifiers, and other components in a sigma blender. The preparation of formulation M is representative. A sigma mixer is set at 350° F. (175° C.), with a nitrogen flow of about seven liter/min. and a mixer speed set at 37 RPM. 10 g of ISPR Res-A-2514 is added to the mixer along with 0.3 g of Irganox 565 and 0.3 g of Irgafos 168, and mixed for two min. 10 g of Solprene 1205 is added to the mixer and mixed for three min. 23.5 g of Kraton 1107 is added to the mixer and mixed for 15 min. 10 g of additional ISPR is added to the mixer and mixed for 10 min. 20 g of additional ISPR is added to the mixer and mixed for 5 min. Finally, 26.5 g of additional ISPR is added to the mixer and mixed for 15 min. The identity and amount (in grams) of each component of formulations J–M are presented in Table 3.

TABLE 3

ADHESIVE COMPOSITIONS L–M

| | FORMULATION | | | |
|---|---|---|---|---|
| COMPONENT | J | K | L | M |
| Elastomers, Tackifiers and Plasticizers | | | | |
| Kraton D-1107 (SIS, SI) | 0 | 0 | 23.5 | 23.5 |
| Quintac 3433 (SIS, SI) | 22.4 | 30 | 0 | 0 |
| Solprene 1205 (SB) | 20.1 | 12.5 | 10 | 10 |
| Escorez 2596 | 57.5 | 57.5 | 39.5 | 0 |
| Res-A-2514 | 0 | 0 | 0 | 66.5 |
| Wingtack 10 | 0 | 0 | 14.5 | 0 |
| Shellflex 371 | 0 | 0 | 12.5 | 0 |
| | 100 | 100 | 100 | 100 |
| Filler and Stabilizers | | | | |
| Igranox 565 | 0.3 | 0.3 | 0.3 | 0.3 |
| Irgafos 168 | 0.6 | 0.6 | 0.6 | 0.6 |
| Butadiene:Isoprene Ratio | 0.9 | 0.4 | 0.4 | 0.4 |

Three multilayer constructions—Control 2, Control 3, and Example 3—were prepared by laminating two adhesive formulations. The particular FSA and LSA layers used to prepare the constructions are identified in Table 4.

TABLE 4

MULTILAYER ADHESIVE LAMINATES

| Layer | Control 2 | Control 3 | Example 3 |
|---|---|---|---|
| FSA | K | K | J |
| LSA | M | L | M |

In both Control 2 and Control 3, the ratio of butadiene-based elastomers to isoprene-based elastomers in the FSA layer was about 0.4:1, while in Example 3, the ratio was about 0.9:1. The two controls differed only in the composition of their respective LSA layers; the LSA of Control 2 (adhesive M) contained an ISPR tackifier and no plasticizer, while Control 3's LSA (adhesive L) contained a normally liquid tackifier and a plasticizer. The FSA (adhesive K) employed in both controls was essentially a miscible formulation of elastomers tackified with a normally solid tackifier. The LSA of Example 3 (adhesive M) was identical to that of Control 2, but the FSA in Example 3 (adhesive J) contained an immiscible blend of elastomers tackified with a normally solid tackifier, with no plasticizer.

Figure 10:
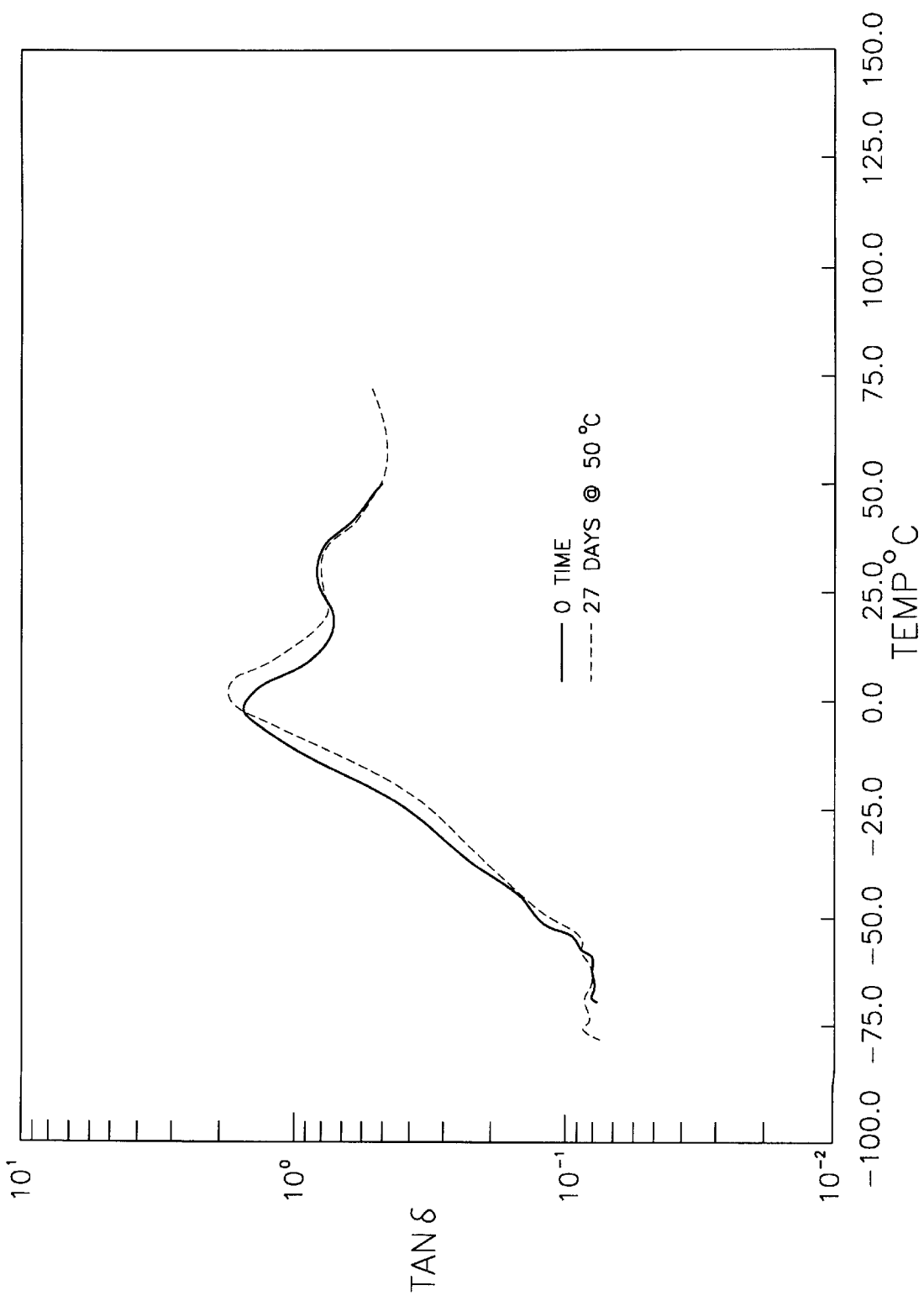
FIG. 10 is a DMS of the multilayer adhesive laminate of Control 2.
Figure 11:
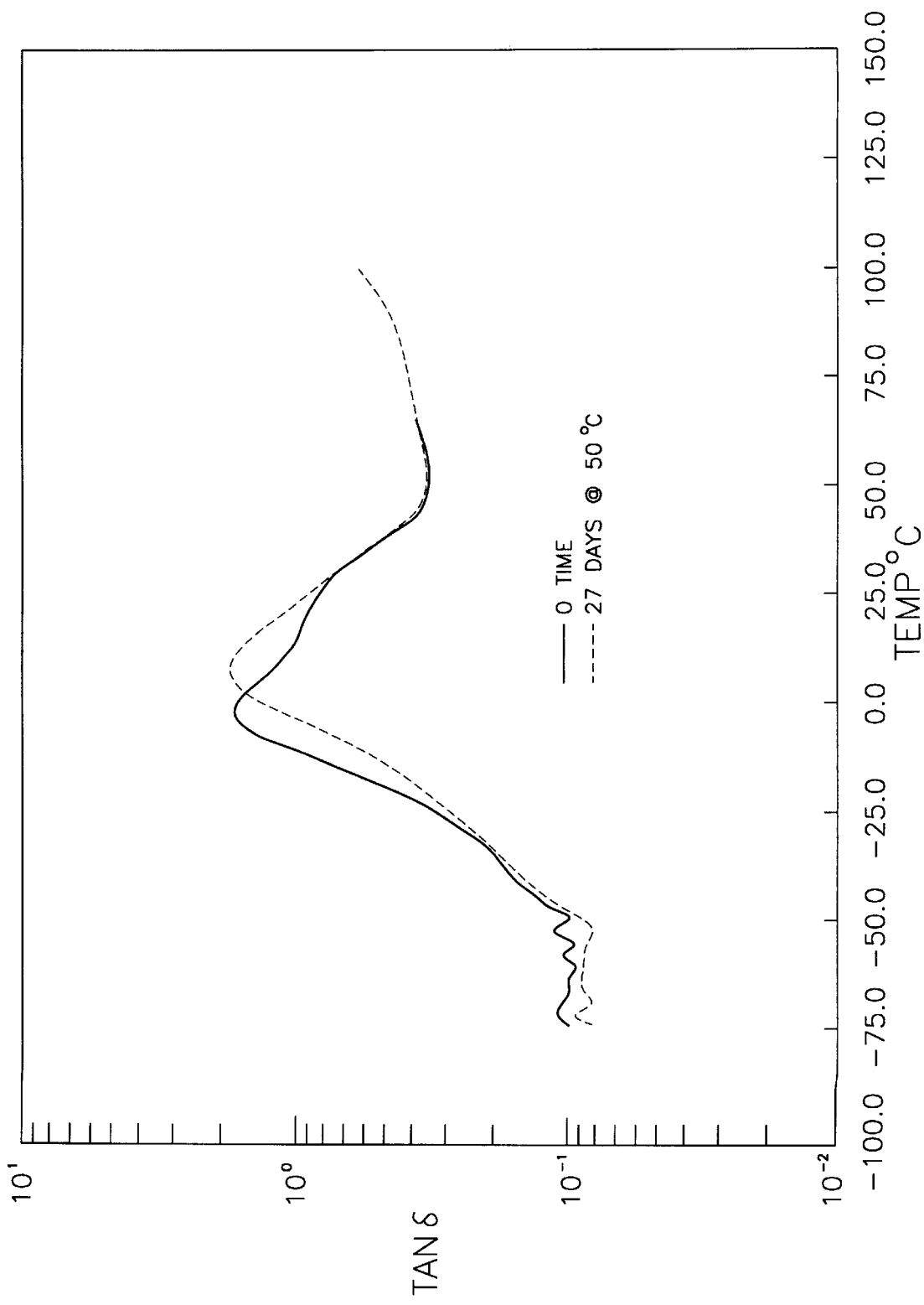
FIG. 11 is a DMS of the multilayer adhesive laminate of Control 3.
Figure 12:
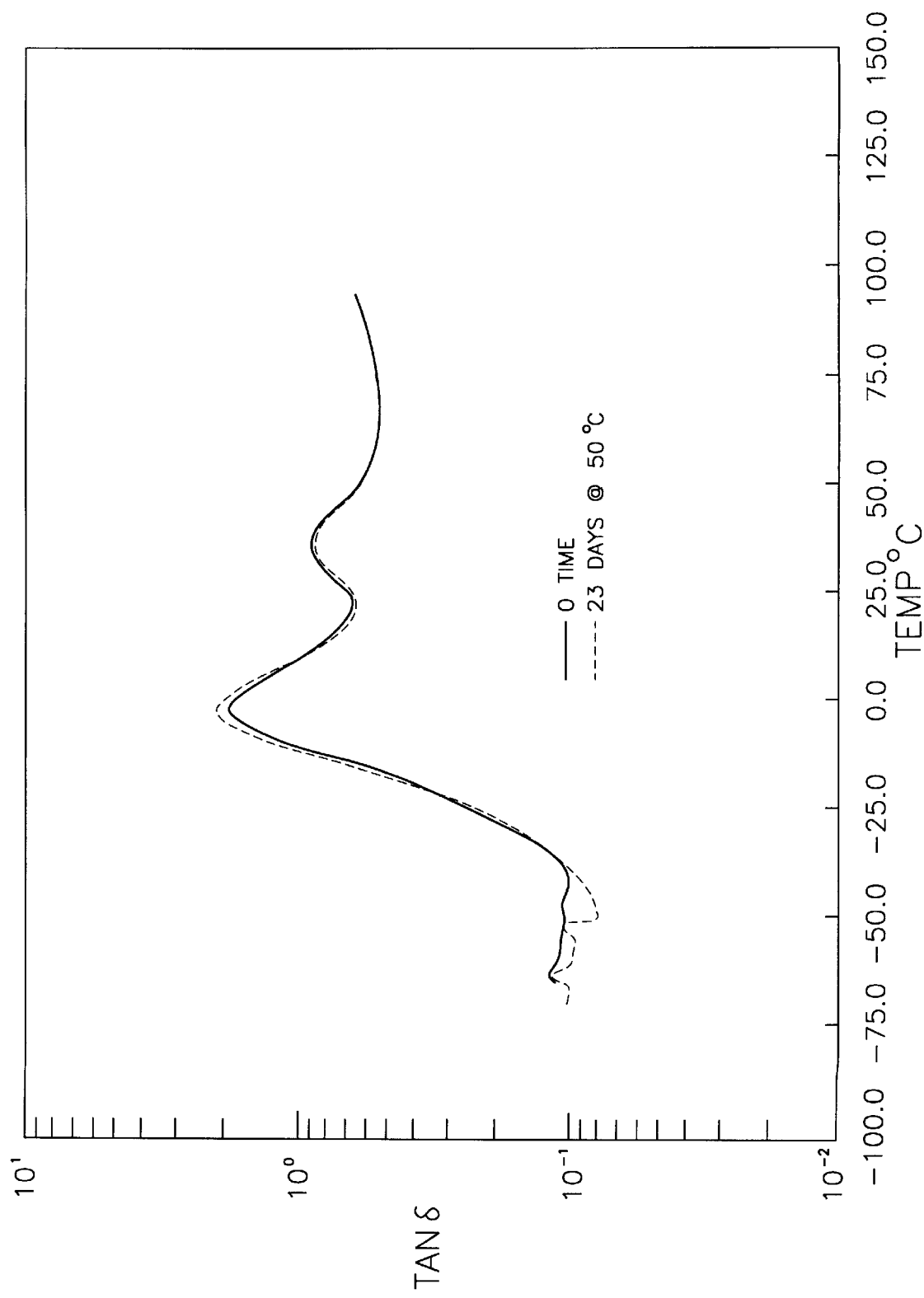
FIG. 12 is a DMS of the multilayer adhesive laminate of Example 3.

Each of Controls 2 and 3 and Example 3 were evaluated for tackifier migration over time by comparing their DMS plots before and after aging. Controls 2 and 3 were aged for 27 days at 50° C. Example 3 was aged for 23 days at 50° C. As shown in FIG. 10, aging caused the two glass transition temperatures in Control 2 to converge toward each other, indicating that tackifiers in the sample had migrated between layers over time. Even greater tackifier migration was observed with Control 3, as shown in FIG. 11. In contrast, and as shown in FIG. 12, the multilayer construction of Example 3 exhibited no substantial tackifier migration between layers over time.

Elevated temperature performance of either the FSA layer 16 or the LSA layer 18 can be enhanced by cross-linking techniques, such as the use of electron beam (EB) radiation, ultraviolet (UV) radiation, and chemical cross-linking. If cross-linking techniques are to be used, it is desirable that substantially the tackifiers employed are substantially saturated (minimal carbon-carbon double bonds) so that all of the energy of cure goes into cross-linking of the elastomeric components of the layers.

Example 4 and Control 4

Adhesive performance and a converting property (maximum web speed in a die-cutting operation) of an adhesive laminate prepared in accordance with the present invention (Example 4) were determined and compared to that of a commercially available hot melt elastomeric PSA laminate (Control 4). In each case, a single adhesive layer or FSA/LSA laminate was hot melt coated on a release liner and laminated to a 50 pound per ream paper facestock, at a coat weight of 20 g/m² The composition of the FSA/LSA adhesive laminate of Example 4 is presented in Table 5, with component amounts expressed in grams. Control 4 was S-2176, a single layer, rubber-based, hot melt PSA available from Avery Dennison Corporation (Pasadena, Calif.).

TABLE 5

COMPOSITION OF EXAMPLE 4

| COMPONENT | FSA | LSA |
|---|---|---|
| Kraton D-1107 (SIS,SI) | — | 23.5 |
| Kraton D-1117 (SIS, SI) | 15 | — |
| Solprene 1205 (SB) | 21 | 11 |
| Res-A-2514 | 30 | 66.5 |
| Escorez 2596 | 35 | — |
| Butadiene:Isoprene Ratio | 1.4 | 0.5 |

Looptack was determined by an Instron machine in which a loop of the adhesive laminate construction is placed in the jaws of the Instron machine with the adhesive side exposed and allowed to descend at a predetermined rate to the surface of a high density polyethylene (HDPE) substrate to cover an area approximately one inch by one inch (2.54 cm by 2.54 cm) and immediately thereafter removed. The peak force was determined and recorded as the looptack value. 90° peel was measured according to Pressure Sensitive Tape Council Test Method No. 2. Looptack tests were conducted at both room temperature (about 23 ° C.) and low temperature (5° C.); 90° peel tests were conducted at room temperature.

Convertibility of the constructions was evaluated by subjecting a web of the adhesive construction to a die-cutting operation in a Mark Andy Press and recording the maximum press speed achieved before web breakage occurred. Two different label configurations were tested: a four-up configuration, with four labels across the web (using an X-die) and a one-up label, with one label across the web (using a V-die). The results of the adhesive performance and converting tests are presented in Table 6.

TABLE 6

ADHESIVE AND CONVERTING PERFORMANCE
OF EXAMPLE 4 AND CONTROL 4

| Performance Property | Example 4 | Control 4 |
|---|---|---|
| Loop Tack from HDPE (N/25 mm) | | |
| At Room Temperature | 12 | 15 |
| At 5° C. | 5 | 1 |
| 90° Peel from HDPE (N/25 mm) | | |
| At Room Temperature | 11 | 12 |
| Maximum Converting Speed (ft./min.) | | |
| 4-Up Label | 815 | 710 |
| 1-Up Label | 675 | 0 |

As indicated in Table 6, multilayer adhesive constructions prepared in accordance with the present invention exhibited better low temperature looptack and higher converting speeds than Control 4. Room temperature looptack and 90° peel were comparable to that of the control. The results can be attributed to the unique two-layer adhesive laminate construction of the present invention, which provides an FSA layer with superior converting characteristics and an LSA layer with optimal PSA properties.

In another aspect of the invention, it has been discovered that tackifier migration from a PSA into a polyolefin facestock can be greatly reduced using single-layer and mutilayer adhesive constructions in which at least an adhesive layer closest to the polyolefin facestock is a two-elastomer system having a continuous phase and a discernible discontinuous phase contained therein, tackified with a normally solid tackifier that is preferentially soluble in the discontinuous phase. The result is a wrinkle-resistant adhesive construction.

In one embodiment of this aspect of the invention, a release liner is hot melt coated with a tackified blend of at least two immiscible elastomers and laminated to a polyolefin facestock. The elastomers are provided in relative proportions such that a first elastomer forms a continuous phase and a second elastomer forms a discontinuous phase contained within and distributed throughout the continuous elastomeric phase. A preferred first elastomer is a butadiene-containing block copolymer or copolymers, e.g., SBS and/or SB block copolymers. Distributed throughout the continuous phase formed by the first elastomer is a discernible, discontinuous phase of a second elastomer or elastomers, such as polyisoprene or, more preferably, an isoprene-containing block copolymer or copolymers, e.g., SIS and/or SI block copolymers. Preferred weight ratios of the butadiene-containing and isoprene-containing copolymers are the same as described above, namely, from about 0.5:1 to 5:1, more preferably from about 1:1 to 5:1 butadiene-based:isoprene-based elastomers. When butadiene-based and isoprene-based copolymers are used to form the PSA layer adjacent the facestock, it is preferred to tackify the elastomers with at least one normally solid tackifier, such as Escorez 1310, which is more soluble in the isoprene-based phase than the butadiene-based phase. It has been found that a significant reduction in facestock swelling is achieved when normally solid tackifiers, rather than a combination of normally solid and liquid tackifiers, are employed. This is illustrated in the following example.

Example 5 and Controls 5–9

Using the formulation and lamination techniques described above, Example 5 and Controls 5–9 were prepared and evaluated for swelling after aging. Example 5 was a two-elastomer system having a butadiene-based continuous phase and an isoprene-based discontinuous phase, tackified with a normally solid tackifier; Control 5 was a one-elastomer system, tackified with a normally solid tackifier; Control 6 was a two-elastomer system having no discernible phase separation according to its clear appearance, tackified with a normally solid tackifier; Control 7 was a two-elastomer system, having no discernible phase separation according to its clear appearance, tackified with both a normally solid and a normally liquid tackifier; Control 8 was a two-elastomer system, with a continuous phase and a discernible discontinuous phase contained therein, tackified with both a normally solid and a normally liquid tackifier; and Control 9 was a one-elastomer system, tackified with both a normally solid and a normally liquid tackifier. In each case, the adhesive was hot melt coated on a release liner and laminated to a polyethylene facestock, at a coat weight of about 20 g/m$^2$.

To evaluate facestock swelling, three 10"×10" (25.4 cm×25.4 cm) square samples of each of Example 5 and Controls 5–9 were prepared, and all four sides of each sample were measured. The samples were allowed to age for nearly six days and then remeasured. The percentage change in dimension of each sample, in both the machine direction and transverse direction, was calculated for each of the three samples and an average was taken. The average overall expansion of the example and the controls was calculated by averaging the machine direction expansion and transverse direction expansion of the constructions. The results of the tests, together with the composition of each of Example 5 and Controls 5–9 are presented in Table 7. Component amounts are expressed in grams. The word "slight" is abbreviated "sl.".

TABLE 7

PSAs FOR POLYOLEFIN FACESTOCKS

| COMPONENT | EX. 5 | CON. 5 | CON. 6 | CON. 7 | CON. 8 | CON. 9 |
|---|---|---|---|---|---|---|
| Kraton D-1107 (SIS, SI) | 8.5 | 20 | 14.5 | 14.5 | 8.5 | 20 |
| Solprene 1205 (SB) | 11.5 | — | 5.5 | 5.5 | 11.5 | — |
| Escorez 1310 | 30 | 30 | 30 | 15 | 15 | 15 |
| Wingtack 10 | — | — | — | 15 | 15 | 15 |
| Butadiene:Isoprene | 1.4 | — | 0.4 | 0.4 | 1.4 | — |
| Morphology | sl. haze | clear | clear | clear | hazy | clear |
| Tackiness | sl. tack | tacky | sl. tack | tacky | tacky | tacky |
| % Expansion on Aging | | | | | | |
| Machine Direction | 1.00 | 2.07 | 1.58 | 4.55 | 4.47 | 4.64 |
| Transverse Direction | 0 | 1.74 | 0.66 | 5.81 | 5.62 | 5.79 |
| Average Expansion | 0.5 | 1.91 | 1.12 | 5.18 | 5.05 | 5.22 |

As seen in Table 7, tackifier migration into polyolefin facestocks is greatly reduced when the adhesive is a phase-separated blend of immiscible elastomers tackified with a normally solid tackifier.

The invention has been described and illustrated by exemplary and preferred embodiments, but is not limited thereto. Persons skilled in the art will appreciate that a variety of modifications can be made without departing from the scope of the invention, which is limited only by the claims. For example, FSAs that prevent tackifier migration into polyolefin facestocks can be made using tackified, phase-separated blends of other types of polymers, such as rubber:acrylic, rubber:silicone, and acrylic:silicone blends.

In both the text and the claims, use of the word "about" in relation to a range of numbers is meant to modify both the low and high values recited.

What is claimed is:

1. A multilayer PSA construction, comprising:
    a. a facestock having an inner surface and an outer surface;
    b. a face side adhesive (FSA) in contact with the inner surface of the facestock, the FSA being formed of a tackified blend of at least two immiscible elastomers provided in relative proportions such that
        i. a first elastomer forms a continuous phase, and
        ii. a second elastomer forms a discontinuous phase, and wherein the blend of elastomers is tackified with a tackifying system that is preferentially soluble in the second elastomer; and
    c. a liner side adhesive (LSA) in contact with the FSA, the LSA being formed of at least one elastomer and at least one tackifier.

2. A multilayer PSA construction as recited in claim 1, further comprising a release liner in contact with the LSA, or a release material coated on the outer surface of the facestock.

3. A multilayer PSA construction as recited in claim 1, wherein the first elastomer has a first diene-containing component having a first glass transition temperature, $T_{g1}$, and the second elastomer has a second diene-containing component having a second glass transition temperature, $T_{g2}$, wherein $T_{g1} < T_{g2}$.

4. A multilayer PSA construction as recited in claim 3, wherein the first diene-containing component is a polymerized butadiene block and the second diene-containing component is a polymerized isoprene block.

5. A multilayer PSA construction as recited in claim 1, wherein the first elastomer is selected from the group consisting of polybutadiene, AB block copolymers, ABA block copolymers, $(AB)_x$ block copolymers, and mixtures thereof, wherein A is a poly(monoalkenylarene) block, B is a polybutadiene block, and x has a value of 3 or more.

6. A multilayer PSA construction as recited in claim 5, wherein A is a polystyrene, poly(alpha-methylstyrene), or poly(vinyltoluene) block.

7. A multilayer PSA construction as recited in claim 1, wherein the second elastomer is selected from the group consisting of polyisoprene, AB block copolymers, ABA block copolymers, $(AB)_x$ block copolymers, and mixtures thereof, wherein A is a poly(monoalkenylarene) block, B is a polyisoprene block, and x has a value of 3 or more.

8. A multilayer PSA construction as recited in claim 7, wherein A is a polystyrene, poly(alpha-methyl styrene), or poly(vinyltoluene) block.

9. A multilayer PSA construction as recited in claim 1, wherein the FSA is formed of a tackified blend of
    (i) SBS and/or SB block copolymers and
    (ii) SIS and/or SI block copolymers.

10. A multilayer PSA construction as recited in claim 1, wherein the LSA is formed of a tackified, miscible blend of
    (a) SBS and/or SB block copolymers, and
    (b) SIS and/or SI block copolymers.

11. A multilayer PSA construction as recited in claim 1, wherein the weight ratio of first to second elastomers in the FSA is greater than or equal to about 0.5:1.

12. A multilayer PSA construction as recited in claim 10, wherein the weight ratio of first to second elastomers in the FSA is greater than about 1:1.

13. A multilayer PSA construction as recited in claim 1, wherein the tackifying system that is preferentially soluble in the second elastomer of the FSA, and the at least one tackifier in the LSA, are independently selected from the group consisting of normally solid tackifiers, normally liquid tackifiers, and intermediate softening point resins.

14. A multilayer PSA construction as recited in claim 1, wherein the tackifying system that is preferentially soluble in the second elastomer of the FSA is obtained by polymerization of a stream of aliphatic petroleum derivatives in the form of dienes and mono-olefins containing 5 or 6 carbon atoms.

15. A multilayer PSA construction as recited in claim 1, wherein the tackified blend of elastomers forming the FSA includes at least one tackifier selected from the group consisting of hydrogenated aromatic resins, hydrogenated polycyclic resins, rosins, rosin esters, polyterpenes, and mixtures thereof.

16. A multilayer PSA construction as recited in claim 1, wherein the tackifying system is present in an amount, based on the total weight of tackifying system and first and second elastomers in the FSA, of from about 50% to 80% by weight.

17. A multilayer PSA construction as recited in claim 1, wherein the tackifying system is present in an amount, based on the total weight of tackifying system and first and second elastomers in the FSA, of from about 60% to 70% by weight.

18. A multilayer PSA construction as recited in claim 1, wherein the tackifying system further comprises at least one plasticizer.

19. A multilayer PSA construction comprising:
    a. a facestock having an inner and an outer surface;
    b. a face side adhesive (FSA) in contact with the inner surface of the facestock, formed of
        i. a continuous phase of at least one butadiene-based elastomer,
        ii. a discontinuous phase of at least one isoprene-based elastomer, and
        iii. a tackifying system that is preferentially soluble in the discontinuous phase of the FSA; and
    c. a liner side adhesive (LSA) in contact with the FSA, formed of at least one tackified elastomer.

20. A multilayer PSA construction as recited in claim 19, wherein the LSA is formed of
    (i) a continuous phase of at least one isoprene-based elastomer,
    (ii) a discontinuous phase of at least one butadiene-based elastomer, and
    (iii) a tackifying system that is preferentially soluble in the continuous phase of the LSA.

21. A multilayer PSA construction as recited in claim 19, wherein the ratio of the at least one butadiene-based elastomer to the at least one isoprene-based elastomer is at least about 0.5:1.

22. A multilayer PSA construction as recited in claim 19, wherein the at least one butadiene-based elastomer comprises SBS and/or SB block copolymers, and the at least one isoprene-based elastomer comprises SIS and/or SI block copolymers.

23. A multilayer PSA construction as recited in claim 19, wherein the tackifying system is present in the FSA in an amount of from about 50% to 80% by weight, based on the total weight of tackifying system and elastomers within the FSA.

24. A multilayer PSA construction as recited in claim 23, wherein the tackifying system is present in the FSA in an amount of from about 60% to 70% by weight.

25. A multilayer PSA construction, comprising:
 a. a facestock having an inner and an outer surface;
 b. a face side adhesive (FSA) in contact with the inner surface of the facestock, the FSA being formed of a first tackified blend of at least two immiscible elastomers provided in relative proportions such that the FSA has a continuous phase and a discontinuous phase, and wherein the first tackified blend of elastomers further comprises at least one tackifier that is preferentially soluble in the discontinuous phase of the FSA; and
 c. a liner side adhesive (LSA) in contact with the FSA, the LSA being formed of a second tackified blend of at least two immiscible elastomers provided in relative proportions such that the LSA has a continuous phase and a discontinuous phase, and wherein the second tackified blend of elastomers further comprises at least one tackifier that is preferentially soluble in the continuous phase of the LSA.

26. A multilayer PSA construction, comprising
 a. a facestock having an inner surface and an outer surface,
 b. a face side adhesive (FSA) in contact with the inner surface of the facestock, formed of
   i. a continuous phase of SBS and/or SB block copolymers,
   ii. a discontinuous phase of SIS and/or SI block copolymers, and
   iii. about 50% to 80% by weight of a first tackifying system, based on the total weight of the block copolymers and the first tackifying system, wherein the first tackifying system is preferentially soluble in the discontinuous phase of the FSA; and
 c. a liner side adhesive (LSA) in contact with the FSA, formed of a miscible blend of
   (i) SBS and/or SB block copolymers, and
   (ii) SIS and/or SI block copolymers, tackified with a second tackifying system.

27. A multilayer PSA construction as recited in any of claims 1, 19, 25 or 26, wherein both the FSA and the LSA are pressure-sensitive adhesives.

* * * * *